(12) United States Patent
Lee et al.

(10) Patent No.: US 11,036,245 B2
(45) Date of Patent: Jun. 15, 2021

(54) CLIMATE CONTROLLER

(71) Applicant: AMBI LABS LIMITED, Hong Kong (CN)

(72) Inventors: Julian Lee, Hong Kong (CN); Mathis Antony, Hong Kong (CN)

( * ) Notice: Subject to any disclaimer, the term of this patent is extended or adjusted under 35 U.S.C. 154(b) by 396 days.

(21) Appl. No.: 14/908,098

(22) PCT Filed: Jul. 23, 2014

(86) PCT No.: PCT/CN2014/082799
§ 371 (c)(1),
(2) Date: Jan. 27, 2016

(87) PCT Pub. No.: WO2015/014229
PCT Pub. Date: Feb. 5, 2015

(65) Prior Publication Data
US 2016/0187899 A1    Jun. 30, 2016

(30) Foreign Application Priority Data
Jul. 29, 2013    (GB) ..................................... 1313444

(51) Int. Cl.
*G05D 27/02* (2006.01)
*G05D 22/02* (2006.01)
(Continued)

(52) U.S. Cl.
CPC .......... *G05D 27/02* (2013.01); *F24F 11/0008* (2013.01); *F24F 11/30* (2018.01);
(Continued)

(58) Field of Classification Search
CPC ........ G05D 27/02; G05D 23/19; G05D 22/02; G05D 23/1902; F24F 11/30; F24F 11/62;
(Continued)

(56) References Cited

U.S. PATENT DOCUMENTS 4,873,649 A * 10/1989 Grald ..................... F25B 49/02
  700/276
5,346,129 A *  9/1994 Shah ..................... F24F 3/1405
  236/44 C
(Continued)

FOREIGN PATENT DOCUMENTS

CN    1722040 A    1/2006
CN  101633302 A    1/2010
(Continued)

OTHER PUBLICATIONS

State Intellectual Property Office of the People's Republic of China (SIPO), International Search Report for International application PCT/CN2014/082799 published as WO2015014229, dated Nov. 13, 2014, pp. 1-5, SIPO, China.
(Continued)

*Primary Examiner* — Ljiljana V. Ciric
(74) *Attorney, Agent, or Firm* — Carmichael & Co. IP

(57) ABSTRACT

A climate controller having a control unit operable to activate and de-activate an HVAC unit, a temperature sensor and a humidity sensor operable to communicate temperature and relative humidity measurements to the control unit, and an interface to a network through which the control unit is operable to connect to a networked server and transmitting measurements for temperature and relative humidity; the control unit operable to activate and de-activate the HVAC unit according to the control unit operable to measure a temperature and humidity level, operable to obtain a value for a temperature setting and mode of operation for the HVAC unit, and operable to communicate a signal to the HVAC unit to effect the activation or de-activation. Climate control is achieved with reference to a comfort level temperature, and energy efficiency is achieved through the
(Continued)

application of machine learning methods operated on data sets gathered by the climate controller.

17 Claims, 7 Drawing Sheets

(51) Int. Cl.
| | | |
|---|---|---|
| F24F 11/30 | (2018.01) | |
| F24F 11/62 | (2018.01) | |
| G05D 23/19 | (2006.01) | |
| F24F 11/00 | (2018.01) | |
| F24F 110/10 | (2018.01) | |
| F24F 110/20 | (2018.01) | |
| F24F 11/64 | (2018.01) | |
| F24F 11/56 | (2018.01) | |
| F24F 11/46 | (2018.01) | |

(52) U.S. Cl.
CPC .............. *F24F 11/62* (2018.01); *G05D 22/02* (2013.01); *G05D 23/19* (2013.01); *G05D 23/1902* (2013.01); *F24F 11/46* (2018.01); *F24F 11/56* (2018.01); *F24F 11/64* (2018.01); *F24F 2110/10* (2018.01); *F24F 2110/20* (2018.01)

(58) Field of Classification Search
CPC .... F24F 11/0008; F24F 11/46; F24F 2110/20; F24F 11/64; F24F 11/56; F24F 2110/10
See application file for complete search history.

(56) References Cited

U.S. PATENT DOCUMENTS

| | | | |
|---|---|---|---|
| 5,579,994 A | 12/1996 | Davis, Jr. et al. | |
| 5,737,934 A | 4/1998 | Shah | |
| 5,751,916 A * | 5/1998 | Kon | F24F 11/0009 700/299 |
| 6,012,296 A * | 1/2000 | Shah | F24F 11/0008 62/173 |
| 6,145,751 A * | 11/2000 | Ahmed | G05D 23/1919 236/51 |
| 6,557,771 B2 * | 5/2003 | Shah | F24F 11/0008 236/44 C |
| 6,853,882 B2 | 2/2005 | Dudley | |
| 6,975,958 B2 | 12/2005 | Bohrer et al. | |
| 6,986,468 B2 * | 1/2006 | Low | G05D 23/1902 236/44 C |
| 7,721,560 B2 * | 5/2010 | Carpenter | F24F 11/0008 236/44 C |
| 7,839,275 B2 * | 11/2010 | Spalink | G05D 23/1931 340/501 |
| 8,356,760 B2 | 1/2013 | Riley, Jr. | |
| 9,074,784 B2 * | 7/2015 | Sullivan | F24F 11/62 |
| 9,097,432 B2 * | 8/2015 | Kreft | F24F 3/14 |
| 9,182,141 B2 * | 11/2015 | Sullivan | F24F 11/30 |
| 9,429,334 B2 * | 8/2016 | Castillo | F24F 11/0008 |
| 9,562,700 B2 * | 2/2017 | Watanabe | F24F 3/153 |
| 9,568,923 B1 * | 2/2017 | Demetriou | H05K 7/20836 |
| 9,976,764 B2 * | 5/2018 | Ostrovsky | F24F 11/0008 |
| 9,996,091 B2 * | 6/2018 | Wells | G05D 23/1902 |
| 10,054,324 B2 * | 8/2018 | Marchetti | F24F 11/30 |
| 10,416,698 B2 * | 9/2019 | Imes | G06Q 50/06 |
| 10,452,061 B2 * | 10/2019 | Yenni | F24F 11/30 |
| 10,454,702 B2 * | 10/2019 | Shetty | F24F 11/62 |
| 10,458,668 B2 * | 10/2019 | Emmons | F24F 11/62 |
| 10,480,808 B2 * | 11/2019 | Keil | G05B 15/02 |
| 10,502,444 B2 * | 12/2019 | Matsuoka | F24F 11/62 |
| 10,523,449 B2 * | 12/2019 | Montalvo | G06Q 50/06 |
| 10,533,761 B2 * | 1/2020 | Barton | F24F 11/30 |
| 10,533,768 B2 * | 1/2020 | Mowris | F24F 11/0001 |
| 10,557,637 B2 * | 2/2020 | Lorenz | F24F 11/58 |
| 10,579,078 B2 * | 3/2020 | Amundson | G05D 23/1904 |
| 10,595,502 B2 * | 3/2020 | Priest | A01K 1/0052 |
| 2005/0144963 A1 * | 7/2005 | Peterson | F24F 11/0001 62/178 |
| 2005/0278071 A1 * | 12/2005 | Durham, III | G05D 23/1932 700/276 |
| 2006/0033625 A1 * | 2/2006 | Johnson | G06Q 10/10 340/573.1 |
| 2007/0156373 A1 * | 7/2007 | Yamashita | F25B 49/005 702/182 |
| 2009/0005912 A1 * | 1/2009 | Srivastava | G05B 13/044 700/276 |
| 2009/0018673 A1 | 1/2009 | Dushane et al. | |
| 2010/0025483 A1 | 2/2010 | Hoeynck et al. | |
| 2010/0070084 A1 | 3/2010 | Steinberg et al. | |
| 2011/0046792 A1 | 2/2011 | Imes et al. | |
| 2011/0056224 A1 * | 3/2011 | Seem | F24F 11/0001 62/186 |
| 2012/0048952 A1 * | 3/2012 | Slingsby | F24F 11/30 236/49.3 |
| 2012/0245740 A1 * | 9/2012 | Raestik | G05B 13/027 700/276 |
| 2012/0305661 A1 | 12/2012 | Malchiondo et al. | |
| 2013/0024799 A1 | 1/2013 | Fadell et al. | |
| 2013/0090767 A1 | 4/2013 | Bruck et al. | |
| 2013/0103622 A1 * | 4/2013 | Matsuoka | H04L 12/2825 706/12 |
| 2013/0173064 A1 * | 7/2013 | Fadell | G05D 23/1902 700/276 |
| 2013/0211783 A1 * | 8/2013 | Fisher | G06F 11/30 702/182 |
| 2013/0245837 A1 * | 9/2013 | Grohman | G05B 15/02 700/276 |
| 2013/0263034 A1 * | 10/2013 | Bruck | G05D 23/1904 715/771 |
| 2013/0274928 A1 * | 10/2013 | Matsuoka | G05D 23/1904 700/276 |
| 2014/0058567 A1 * | 2/2014 | Matsuoka | G05D 23/1917 700/276 |
| 2014/0277769 A1 * | 9/2014 | Matsuoka | F24F 11/30 700/278 |
| 2014/0324244 A1 * | 10/2014 | Musunuri | G05B 15/02 700/299 |
| 2014/0358291 A1 * | 12/2014 | Wells | G05D 23/1902 700/276 |
| 2015/0088786 A1 * | 3/2015 | Anandhakrishnan | G06F 19/00 706/11 |
| 2015/0133043 A1 * | 5/2015 | Patel | F24F 11/0001 454/258 |
| 2015/0167999 A1 * | 6/2015 | Seem | F24F 11/30 700/276 |
| 2015/0198346 A1 * | 7/2015 | Vedpathak | G05B 15/02 700/278 |
| 2015/0204559 A1 * | 7/2015 | Hoffberg | G06N 7/06 700/278 |
| 2015/0248118 A1 * | 9/2015 | Li | F24F 11/30 700/295 |
| 2015/0276238 A1 * | 10/2015 | Matsuoka | G05B 15/02 700/278 |
| 2015/0306957 A1 * | 10/2015 | Sujan | B60W 50/0097 701/94 |
| 2016/0007426 A1 * | 1/2016 | Ashdown | H05B 37/0227 700/90 |
| 2016/0123617 A1 * | 5/2016 | Vega | G05B 13/0265 706/12 |
| 2016/0223218 A1 * | 8/2016 | Barrett | F24F 11/30 |
| 2016/0246269 A1 * | 8/2016 | Ahmed | F24F 11/46 |
| 2016/0305678 A1 * | 10/2016 | Pavlovski | G05B 13/048 |
| 2016/0320081 A1 * | 11/2016 | Nikovski | G05B 13/048 |
| 2017/0051937 A1 * | 2/2017 | Toyoshima | F24F 11/30 |
| 2017/0053068 A1 * | 2/2017 | Pillai | G06Q 50/10 |
| 2017/0070842 A1 * | 3/2017 | Kulp | H04W 4/021 |
| 2017/0205105 A1 * | 7/2017 | Adam | F24F 11/30 |
| 2017/0331899 A1 * | 11/2017 | Binder | H04L 67/12 |
| 2018/0046173 A1 * | 2/2018 | Ahmed | G05B 15/02 |
| 2018/0048483 A1 * | 2/2018 | Shetty | F24F 11/62 |
| 2018/0088544 A1 * | 3/2018 | Sawada | G06F 19/00 |
| 2018/0187484 A1 * | 7/2018 | Hebeisen | F24F 11/62 |

(56) References Cited

U.S. PATENT DOCUMENTS

| | | | | |
|---|---|---|---|---|
| 2019/0086106 A1* | 3/2019 | Okita | .................. | F24F 11/46 |
| 2019/0128548 A1* | 5/2019 | Lau | .................. | F24F 11/46 |
| 2019/0242599 A1* | 8/2019 | Sakai | .................. | F24F 7/007 |
| 2019/0257539 A1* | 8/2019 | Lau | .................. | F24F 11/46 |
| 2019/0257542 A1* | 8/2019 | Matsuoka | .............. | F24F 11/30 |
| 2019/0278680 A1* | 9/2019 | Fisher | .............. | G05D 23/1904 |
| 2019/0285078 A1* | 9/2019 | Toy | .................. | F04D 27/00 |
| 2019/0285299 A1* | 9/2019 | Steinberg | ............ | H04W 4/021 |
| 2019/0338968 A1* | 11/2019 | Smith | ................ | G05B 13/024 |
| 2020/0029459 A1* | 1/2020 | De Felice | ............. | H05K 7/207 |

FOREIGN PATENT DOCUMENTS

| | | | |
|---|---|---|---|
| CN | 101782261 | A | 7/2010 |
| CN | 101809514 | A | 8/2010 |
| CN | 102132223 | A | 7/2011 |
| CN | 102338443 | A | 2/2012 |
| JP | H03204536 | A | 9/1991 |
| JP | H04131639 | A | 5/1992 |
| JP | H08-005126 | A | 1/1996 |
| JP | H10073300 | A | 3/1998 |
| JP | 2003139372 | A | 5/2003 |
| JP | 2005226845 | A | 8/2005 |
| JP | 2007032875 | A | 2/2007 |
| JP | 2011058668 | A | 3/2011 |
| JP | 2012149839 | A | 8/2012 |
| JP | 2013076493 | A | 4/2013 |
| WO | 2012068517 | A | 5/2012 |

OTHER PUBLICATIONS

Wang, Xiujuan, "The Design and Implementation of home climate controller based on the human comfort index", Chinese Master's Theses Full-Text Database Information Science and Technology, vol. No. 3, Jul. 15, 2013, pp. 16-17, 19, 28-36, 42, 57.
JPH08-005126 English translation, Mar. 30, 2020, www.j-platpat.inpit.go.jp.
JPH08-005126 summary of relevancy, Mar. 30, 2020, www.j-platpat.inpit.go.jp.
JP2012149839 English translation, Mar. 30, 2020, www.j-platpat.inpit.go.jp.
JP2012149839 summary of relevancy, Mar. 30, 2020, www.j-platpat.inpit.go.jp.
JPH03204536 English translation, Mar. 30, 2020, www.j-platpat.inpit.go.jp.
JPH03204536 summary of relevancy, Mar. 30, 2020, www.j-platpat.inpit.go.jp.
JP2003139372 English translation, Mar. 30, 2020, www.j-platpat.inpit.go.jp.
JP2003139372 summary of relevancy, Mar. 30, 2020, www.j-platpat.inpit.go.jp.
JPH04131639 English translation, Mar. 30, 2020, www.j-platpat.inpit.go.jp.
JPH04131639 summary of relevancy, Mar. 30, 2020, www.j-platpat.inpit.go.jp.
JP2005226845 English translation, Mar. 30, 2020, www.j-platpat.inpit.go.jp.
JP2005226845 summary of relevancy, Mar. 30, 2020, www.j-platpat.inpit.go.jp.
JP2011058668 English translation, Mar. 30, 2020, www.j-platpat.inpit.go.jp.
JP2011058668 summary of relevancy, Mar. 30, 2020, www.j-platpat.inpit.go.jp.
JPH10073300 English translation, Mar. 30, 2020, www.j-platpat.inpit.go.jp.
JPH10073300 summary of relevancy, Mar. 30, 2020, www.j-platpat.inpit.go.jp.
JP2013076493 English translation, Mar. 30, 2020, www.j-platpat.inpit.go.jp.
JP2013076493 summary of relevancy, Mar. 30, 2020, www.j-platpat.inpit.go.jp.
JP2007032875 English translation, Mar. 30, 2020, www.j-platpat.inpit.go.jp.
JP2007032875 summary of relevancy, Mar. 30, 2020, www.j-platpat.inpit.go.jp.
CN101782261 English translation, Mar. 30, 2020, www.patents.google.com.
CN101782261 summary of relevancy, Mar. 30, 2020, www.patents.google.com.

* cited by examiner

CLIMATE CONTROLLER

FIELD OF THE INVENTION

The invention relates to indoor climate control and more particularly to controllers and methods for the control of indoor climate control appliances. The invention has been described herein primarily in relation to controlling HVAC units, but is not limited to this particular application.

BACKGROUND OF THE INVENTION

Heating, ventilation and air conditioning units (generally referred to as HVAC units) are generally 'dumb' devices, not taking advantage of modern technical advances such as machine learning and user experience design. A user of a typical HVAC unit is presented with a number of modes, such as heating, cooling, drying (removal of moisture from the air), fan and off, and a desired indoor room temperature. The user selects his preferred mode, sets the desired temperature, and the HVAC unit will run its heating or cooling element until that temperature is reached, then switch it off, then when there is a temperature differential again it will switch it on again, and so on. In the case of drying and fan modes, the absolute temperature will never be reached, so the unit will continue to run indefinitely irrespective of a user's comfort. More advanced HVAC units may control the frequency of their heating or cooling elements via an inverter, meaning that the element does not need to be repeatedly switched on and off, but still fail to take into account a user's comfort.

Problems with this basic 'dumb' functionality are immediately apparent. It is well known that relative humidity affects humans' perception of temperature and thus the level of comfort they feel—apparent temperature, what it feels like, increases as a function of absolute temperature and relative humidity. Cooling the air is not enough—this would increase the relative humidity in the indoor climatic environment, which is why typical HVAC units both cool the air and remove moisture from it.

Regulating indoor climatic conditions to a comfort level instead of an absolute temperature benefits energy efficiency. If humidity is lower, the user's comfort level may be improved but most existing typical HVAC units do not measure humidity. U.S. Pat. Nos. 5,737,934 and 8,356,760 describe methods of controlling an HVAC unit according to apparent temperature, taking into account relative humidity as well as absolute temperature. Or when the HVAC unit is operating in drying or fan modes, the user may begin to feel cooler due to a reduction in the apparent temperature, or the effects of moisture evaporating from his skin. These factors are not taken into account by the control mechanisms of a typical HVAC unit, which continues its operation regardless, resulting in wasted energy.

Monitoring and controlling humidity has additional benefits: a drier environment will suffer less from mould growth, while a more humid environment is better for the skin. It is also well known that regulating humidity has an effect on the survival and propagation of bacteria and viruses.

Furthermore, if a HVAC unit was capable of smart operation, it could gently 'glide' the temperature towards the desired end point, for example according to common PID (proportional-integral-derivative) algorithms, resulting in energy savings when compared to a simple on/off control system. Additionally, each mode of the HVAC unit will have its own characteristic energy consumption, so a combination of modes could be utilized when activating the unit to keep the user at a comfortable temperature whilst minimizing energy usage.

When compared to a simple HVAC system which either adds or removes heat from the air based on whether it is on or off, which in turn is based on the absolute temperature, sophisticated control methods may reduce energy consumption but at the risk of increasing the time taken to get to a desired end point apparent temperature. A desirable controller would therefore present the user with possible options for its control method, or ranges of possible temperature/relative humidity comfort levels compared to the energy and time taken to get there.

Of course, indoor climate control will also depend upon the climate outside the building or room in which the climatic conditions are being controlled by a HVAC unit. For dumb units with no concern for the energy they are using, the outside climate is not a relevant factor as such units operate only according to the immediate indoor environment in which they are situated. However, the energy used to reach a desired end point is proportional to the temperature differential between the immediate indoor environment and the outside climate. Some HVAC units incorporate an outdoor thermometer in their vent but this measures temperature only. A desirable smart climate controller would take into account the outside conditions and suggest a range of possible comfort levels (being a combination of temperature and relative humidity) to a user based on how much energy the user wishes to expend. Such a smart controller could be connected to a network to retrieve data on outside conditions, such as current temperature and relative humidity, forecast temperature and relative humidity, cloud cover, UV penetration, air pressure and wind speed, and even minor factors which may impact energy consumption and comfort levels such as particulate matter concentration and air composition. U.S. Pat. No. 6,853,882 describes a networked, location aware HVAC control system although it is directed at using a plurality of sensors in one contiguous indoor location and still offers only a relatively dumb level of control. U.S. Pat. No. 6,975,958 describes a method for influencing a price-conscious user's control of a HVAC system via signals sent from a network, but does not describe direct control of the HVAC unit.

Connecting such a smart controller to a network introduces a number of further advantages. The user can operate the controller remotely, for example to activate his HVAC unit so that indoor conditions in his home reach a desired end point prior to his return home from work; or to ensure the comfort levels of his pet while he is away from home. Unattended operation would also become possible according to outside conditions: a user on holiday could for example set his HVAC unit to activate if the indoor temperature falls below a certain level and the weather is not forecast to improve for several days; this could save his indoor plants from cold damage. PCT publication WO2012068517 describes a user friendly, network accessible user interface, but it offers only a relatively dumb interface and does not describe comfort levels or the interaction of temperature, humidity, energy and time.

In addition to temperature differential, the energy used to reach a desired end point depends on a number of factors such as characteristics of the HVAC unit (including efficiency, power draw, maintenance level); size of the indoor environment; whether any doors or windows are open in the indoor environment; other sources of heat or cooling present in the indoor environment. Therefore it is desirable that an indoor climate controller could learn more significant and/or predictable factors that go into establishing a certain comfort level, preferably without the need for user feedback. Ideally such a system would also discriminate less significant or unpredictable factors. Such a controller could present energy usage of a HVAC unit as a relative value instead of or in addition to a strict kilo-Watt or kilo-Joule figure. U.S. Pat. No. 5,579,994 describes the use of fuzzy logic, a branch of machine learning, as part of a rules-based inference engine to control the indoor climate of a car based on a number of inputs. Significantly, the rules are established in the factory—the patentee knows the exact size of the car, characteristics of the HVAC unit and other inputs that enable this to be effective, but it lacks adaptability.

A further problem with current HVAC infrastructure is that in many buildings, legacy HVAC units are already installed. The cost of upgrading is high, and some residents may be leaseholders unable or unwilling to replace those HVAC units. There is thus a need for a device which can add smart functionality to existing HVAC units.

Finally, although modern HVAC units may offer a range of modes which can benefit energy efficiency, a typical user finds this bewildering and has no idea how to set the unit to provide a comfortable environment at the lowest cost—akin to programming a VCR—or even what actually constitutes a comfort level in terms of temperature and humidity. To achieve energy efficiency, this needs to be made transparent to average users, and in particular suggesting comfort levels to them based on average humans' comfort levels in indoor environments for a given outside environment is desirable.

There is thus a need to design an indoor climate controller capable of interfacing with HVAC units and controlling their operation. It is an object of the present invention to improve on the foregoing disadvantages of the existing art, whilst introducing advantageous new functionality.

SUMMARY OF THE INVENTION

The present invention provides, in a first aspect, a climate controller comprising: a control unit for controlling one or more functions of an HVAC unit servicing a climate controlled space; a temperature sensor for taking temperature measurements and communicating the temperature measurements to the control unit; and a humidity sensor for taking humidity measurements and communicating the humidity measurements to the control unit. The control unit controls the one or more functions of the HVAC unit based on the temperature and humidity measurements to achieve a desired temperature and a desired humidity in the climate controlled space.

In a second aspect, the present invention provides a climate controller, comprising a control unit capable of activating and de-activating an HVAC unit, a temperature sensor and a humidity sensor capable of communicating temperature and relative humidity measurements to the control unit, and an interface to a network through which the control unit is capable of connecting to a networked server and transmitting measurements for temperature and relative humidity; said activation and deactivation capable of being controlled according to the control unit measuring a temperature and humidity level, obtaining a value for a temperature setting and mode of operation for the HVAC unit, and communicating a signal to the HVAC unit to effect said activation or de-activation. Climate control is effected with reference to a comfort level in preference to an absolute temperature, and energy efficiency is achieved through the application of machine learning methods operated on data sets gathered by the climate controller, which can generate a climatic path, being a combination of modes of operation of the HVAC unit and target absolute temperatures, requiring the least energy to reach a certain comfort level.

The HVAC unit and the climate controller are situated in the same indoor climatic environment which is to be regulated.

Preferably, the desired (or "end point") relative humidity and desired (or "end point") temperature values for the indoor climatic environment are set over the network through a user interface running on a computer. The computer may be situated with the user, such as a touchscreen smartphone, or it may be a server remote from the user which the user interfaces with via a standard protocol such as HTML. The network interface of the climate controller is preferably a wifi module but could be any type of network interface such as radio, ethernet, or Bluetooth.

After first switch-on, a user may enter the climate controller into an initial learning mode, in which the climate controller retrieves a value representing the outside conditions, preferably including temperature, wind speed and cloud cover, from a networked server, based on the location of the controller. The user may optionally enter known parameters of the HVAC unit such as its power consumption and/or cooling capacity, or these may be retrieved automatically from a networked server. Alternatively, the parameters of the HVAC unit may be estimated during the controller's learning mode or during its operating mode.

Preferably, the climate controller is capable of additionally estimating parameters of the indoor climatic environment such as may affect the operation of the HVAC unit when trying to regulate indoor climate, or in an alternative embodiment a user may optionally enter such parameters. Such parameters may include air flow and room size.

Preferably, the climate controller is capable of communicating with the HVAC unit by non-invasive means, such as replicating the infra red signals of the HVAC unit's remote control. In an alternative embodiment, the climate controller may alternatively directly control the HVAC unit's a.c. power supply for example by mediating between an a.c. power socket and the HVAC unit's power plug. In another alternative embodiment, the climate controller may directly interface with the HVAC unit's control circuitry.

During learning mode, the climate controller cycles activation of the HVAC unit in its various modes such as heating, drying, cooling and fan, whilst measuring temperature change and relative humidity change. It is thus able to compute estimated energy consumption parameters. Preferably, using known parameters of the HVAC unit and/or the indoor climatic environment, the estimated energy consumption parameters can be computed more accurately. At the end of learning mode, the parameters may be stored on the climate controller or a networked server.

During its operation mode, the climate controller is able to cycle activation of the HVAC unit in its various modes to reach a desired end point comfort level. The activation cycling of the HVAC unit is determined from the known parameters stored on the climate controller or networked server, including its energy consumption and other parameters, the known parameters of the indoor climatic environment, and known outside conditions retrieved from a networked server, according to standard machine learning techniques. Preferably, the machine learning techniques are further able to learn and refine the stored parameters according to the real-world operation of the climate controller.

The user interface is thus able to present to a user a display combining desired end points for temperature, relative humidity, energy consumption, and time taken to achieve a certain comfort level. The machine learning techniques employed are preferably able to suggest a range of possible comfort levels, energy consumption and time taken to the user whereby constraining one or more of the ranges will affect and present intuitively to the user an achievable range for the other desired end points.

Further features of various embodiments of the present invention are defined in the appended claims. It will be appreciated that features may be combined in various combinations in various embodiments of the present invention.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

For a better understanding of the invention and to show how the same may be performed, a preferred embodiments thereof will now be described, by way of non-limiting examples only, with reference to the accompanying drawings.

BRIEF DESCRIPTION OF THE DRAWINGS

Non-limiting examples are described with reference to the following figures, in which.

DETAILED DESCRIPTION

Figure 1:
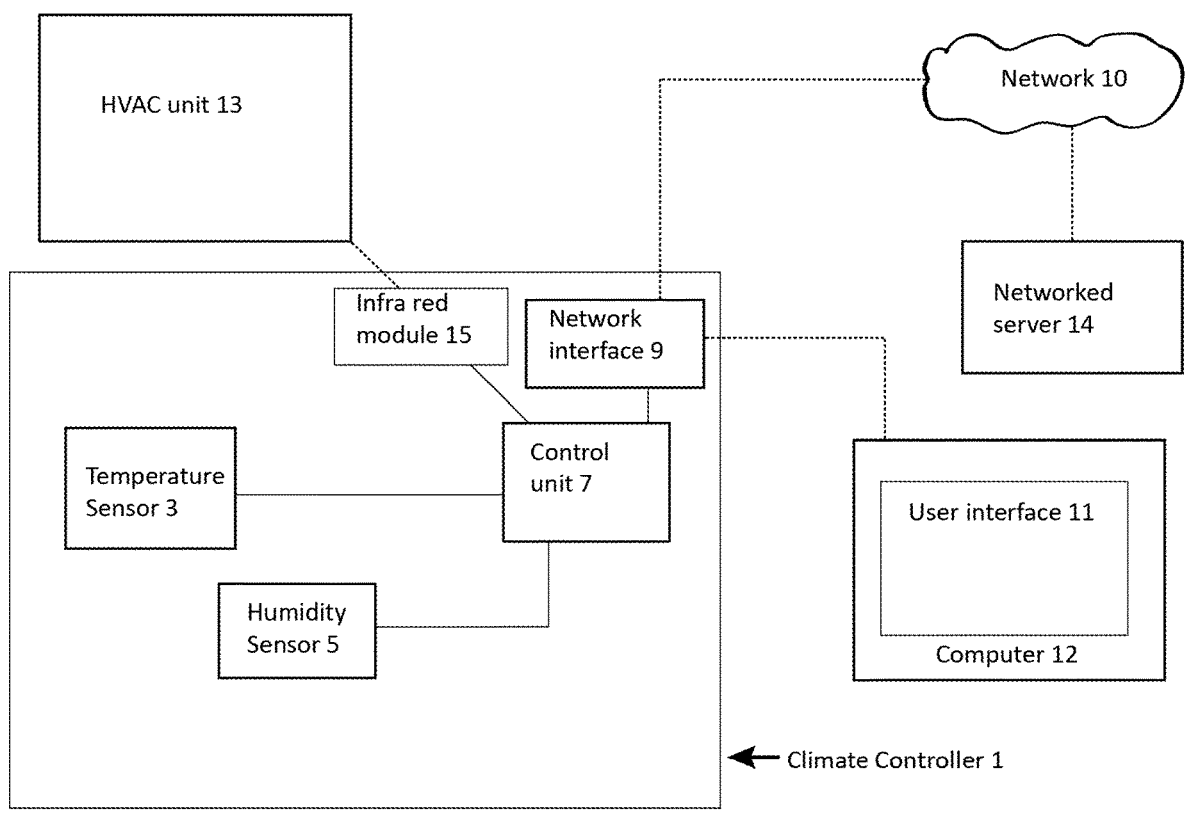
FIG. 1 shows a block diagram of a climate controller according to an embodiment of the present invention.

Referring to the figures, a climate controller 1 comprises a control unit 7 for controlling one or more functions of an HVAC unit 13 servicing a climate controlled space. A temperature sensor 3 takes temperature measurements and communicates the temperature measurements to the control unit 7. A humidity sensor 5 takes humidity measurements and communicates the humidity measurements to the control unit 7. The control unit 7 controls the one or more functions of the HVAC unit 13 based on the temperature and humidity measurements to achieve a desired temperature and a desired humidity in the climate controlled space. The one or more functions can be selected from the following: temperature setting, fan speed setting, mode, heating/cooling/drying/ventilation mode setting, and on/off setting. However, HVAC units can include other functions and these can also be selected.

The control unit 7 controls the functions of the HVAC unit by sending signals to the HVAC unit to set setpoints for one or more of the functions. The setpoints are calculated from machine learning methods trained on past temperature and humidity measurements to predict future temperatures and humidities. Suitable machine learning methods include those based on machine learning algorithms such as support vector machines, random forests, and neural networks. These perform processes such as feature selection, dimensionality reduction, and regression analysis in order to generate setpoints or target vectors.

In addition to past temperature and humidity measurements, the machine learning methods calculate the setpoints based on one or more further environmental parameters. The one or more further environmental parameters can be selected from the following: luminosity, time of day, passive infrared activity count, outdoor temperature, and outdoor humidity. These parameters can be measured by sensors, or can be obtained from the internet, or can simply be entered by a user. For example, outdoor temperature and humidity can be scraped from websites on the internet.

The climate controller 1 further comprises a network interface 9 to communicatively connect the control unit 7 to a computer processor. The computer processor implements the machine learning methods to calculate the setpoints. In another embodiment, the computer processor also obtains one or more of the environmental parameters. The computer processor can form part of one of the following: a networked server, a desktop computer, a laptop computer, a smartphone. FIG. 1 shows an embodiment where the computer processor is part of a networked server 14.

The climate controller further comprises a data storage device communicatively connected to the computer processor. The data storage device stores one or more of the environmental parameters for use as past data by the machine learning methods to calculate the setpoints. In FIG. 1, the data storage device forms part of the networked server 14.

It is often convenient to set a desired apparent temperature, such as one calculated using the humidex. An apparent temperature takes into account temperature (dry bulb) and humidity, and is a measure of how hot the environment feels to a person.

The network interface 9 communicatively connects the control unit to a computer processor. The computer processor receives one or more of the desired temperature, humidity, and apparent temperature as selected by a user. The computer processor in this case can be the same computer processor described above that implements the machine learning methods, or it can be part of a separate device. In FIG. 1, the computer processor is part of a separate device, namely, a computer 12. The computer 12 has a user interface 11 to allow the user to enter the desired temperature, humidity, or apparent temperature. Alternatively or additionally, the computer processor is communicatively connected to a data storage device and retrieves one or more of the desired temperature, humidity, and apparent temperature pre-stored on the data storage device.

In some embodiments, one or more of the desired temperature, humidity, and apparent temperature lie within a respective comfort band defined by a minimum and a maximum respective desired temperature, humidity, or apparent temperature. The computer processor can receive the comfort band as selected by a user. Alternatively or additionally, the computer processor is communicatively connected to a data storage device and retrieves the comfort band pre-stored on the data storage device. In this way, the climate controller 1 can operate fully automatically without the user needing to input a desired temperature, humidity, or apparent temperature. In one embodiment, the comfort band is customized for a particular user. In another embodiment, the minimum and maximum values defining the comfort band vary during the day. In a further embodiment, the computer processor recommends the comfort band to a user.

The setpoints can be selected on the basis of the minimum power consumption required to achieve the desired temperature and humidity. The setpoints can also be selected on the basis of a target time required to achieve the desired temperature and humidity.

Figure 2:
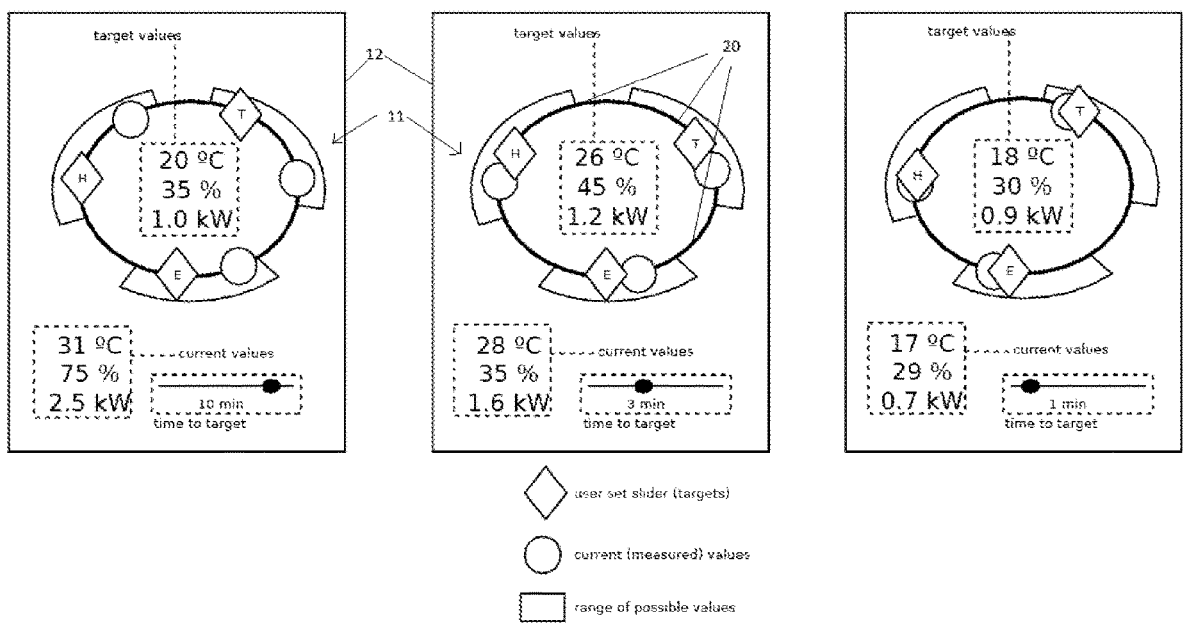
FIG. 2 shows three configurations of a user interface for a climate controller according to an embodiment of the present invention.
Figure 3:
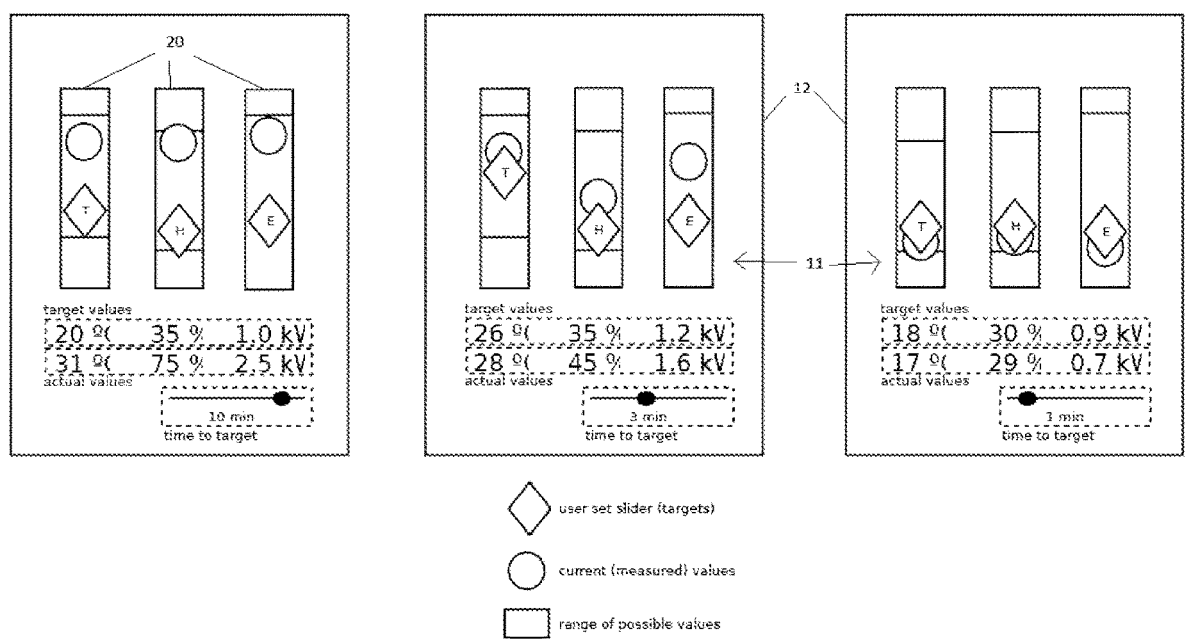
FIG. 3 shows three configurations of a user interface for a climate controller according to another embodiment of the present invention.

The user interface 11 can display the temperature and humidity measurements in real time. As shown in FIGS. 2 and 3, the user interface comprises a temperature slider, a humidity slider, an energy slider, and a time slider, each slider displaying a desired value, a current value, and a range of possible values calculated taking into account the settings of the other sliders.

In one preferred embodiment, the climate controller 1 communicates with the HVAC unit by non-invasive means. In one particular example, the HVAC unit 13 is controlled by a remote control operated by a user. The remote control sends infrared signals to the HVAC unit 13 to control one or more or all functions of the HVAC unit 13. The climate controller 1 includes an infrared module 15, and the control unit 7 controls one or more functions of the HVAC unit 13 by using the infrared module 15 to replicate one or more or all of the infrared signals normally provided by the remote control. This embodiment is particularly advantageous in that the climate controller 1 can be used with existing HVAC units without any modification to the HVAC unit itself.

The present invention also provides a method of controlling a climate in a climate controlled space using a climate controller. In one embodiment, the climate controller comprises: the temperature sensor 3 for taking temperature measurements; and the humidity sensor 5 for taking humidity measurements. The embodiment comprises controlling one or more functions of the HVAC unit 13 servicing the controlled climate space based on the temperature and humidity measurements to achieve a desired temperature and a desired humidity in the climate controlled space.

The embodiment more particularly comprises: using machine learning methods trained on past temperature and humidity measurements to predict future temperatures and humidities in order to calculate setpoints for one or more of the functions that achieve a desired temperature and a desired humidity in the climate controlled space; and sending signals to the HVAC unit 13 to set the setpoints.

Other embodiments of the method of controlling a climate in a climate controlled space according to the present invention can be appreciated from the foregoing description.

The following description describes further details of other embodiments and relates in general to a system and method for indoor climate control effected via a HVAC unit implemented in a climate controller.

FIG. 1 shows a preferred embodiment of a climate controller according to the present invention. The climate controller 1 incorporates a temperature sensor 3, a relative humidity sensor 5, a control unit 7, and a network interface 9. The climate controller is capable of controlling the mode and activation of a HVAC unit 13 by, in a preferred embodiment of the invention, generating infrared signals compatible with the HVAC unit's remote control protocol through infrared module 15.

A user interface 11 is presented to a user of the climate controller 1 on a computer 12, in a preferred embodiment a touch screen smartphone or tablet device. The user interface 11 communicates with the climate controller 1 via the network interface 9. In a preferred embodiment, the user interface 11 displays sliders 20 indicating and capable of setting an indoor temperature T as measured at a dry bulb by temperature sensor 3, indoor relative humidity H as measured by humidity sensor 5, and energy consumption E of the HVAC unit 13. Through testing, it has been found that the following linear model is a usable approximation for the relationship between T, H and E:

For changing T:
$H(T) = a_T \cdot T + b_T$
$E(T) = \alpha_E \cdot |T - T_{outside}|$ For changing H:
$T(H) = a_H \cdot H + b_H = (1/a_T) \cdot T - (b_T/a_T)$
$E(H) = \alpha_E \cdot |T(H) - T_{outside}|$ For changing E:
$T(E) = T_{outside} \pm (E/\alpha_E)$
$H(E) = a_E \cdot T(E) + b_T$ Where:

$T_{outside}$ is the outside temperature outside the indoor climate affected by the HVAC unit 13, retrieved by the control unit 7 from the network 10 via the network interface 9. In a preferred embodiment, geolocation features of the computer 12 are employed to precisely locate the controller 1 and enable precise identification of $T_{outside}$;

$a_T$, $b_T$, and $\alpha_E$ are parameters of the indoor climatic environment to be identified by the controller;

|x| indicates the absolute or modulus value of x; and

± is chosen depending whether the controller must heat or cool the indoor climatic environment to reach a desired comfort level.

Figure 4:
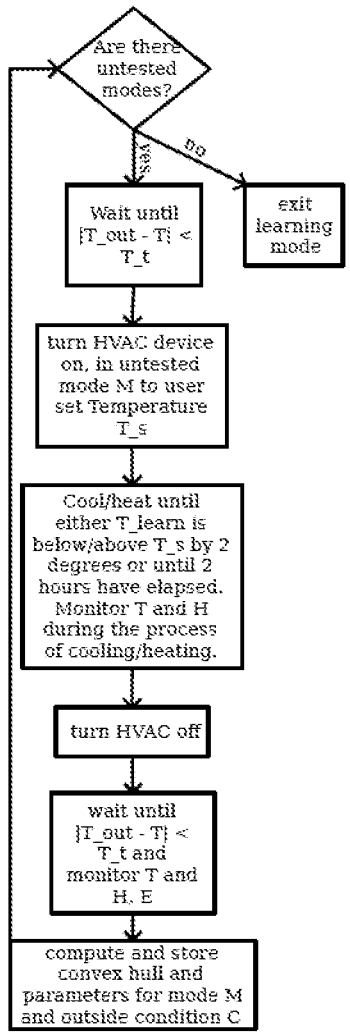
FIG. 4 is a block diagram of the operation of a climate controller in learning mode according to another embodiment of the present invention.

A preferred embodiment of the climate controller possesses a learning mode shown in FIG. 4, designed to be engaged when the controller 1 is first operated in conjunction with a new HVAC unit 13 or moved to a new location. In the learning mode, the controller checks whether there are untested modes according to its data on the HVAC unit 13 either entered by a user, gathered from the network 10, or stored on the control unit 7. If there are no untested modes, the controller exits learning mode. If there are untested modes, the control unit 7 obtains from the network 10 a value for the temperature outside the location of the HVAC unit 13, referred to as T_out. The control unit 7 then waits until the absolute or modulus value of the difference between T_out and the indoor temperature T, as measured by the temperature sensor 3, is less than a threshold temperature T_t preset to a small number (through testing, 2° C. has been found to work well). The real-world significance of this is that the control unit 7 is constantly monitoring indoor temperature T via the temperature sensor 3 and waiting for it to reach approximate equilibrium with the outside temperature T_out.

When that condition is true, the control unit 7 will, in a preferred embodiment, activate the untested mode of the HVAC unit 13 via the infrared module 15 to a user set a desired temperature setting for that mode T_s. T_s is the temperature at which the user feels they would be comfortable. The control unit 7 begins recording values for indoor dry bulb temperature and relative humidity as measured by sensors 3 and 5 at regular time intervals, and storing said recorded values on either the control unit 7 or in a preferred embodiment on the network server 14. Through testing, a preferred time interval has been found to be every five minutes.

The control unit 7 will maintain activation of the HVAC unit 13 until, if in a cooling mode, the indoor temperature T reaches a value T_learn which is below T_s, or if in a heating mode, the indoor temperature T reaches a value T_learn which is above T_s. T_learn is automatically set by the control unit 7 to be several degrees away from T_s at an uncomfortable temperature for the user.

Through testing, the best value for T_learn has been found to be ±2° C. of T_set. If T_learn cannot be reached, the control unit 7 will cease activation of the HVAC unit after an appropriate time period, which through testing has been determined to be two hours. When activation is no longer desired the control unit 7 will deactivate the HVAC unit 13 via, in a preferred embodiment, the infra red module 15.

Following deactivation of the HVAC unit 13, the control unit 7 continues to monitor and store values for temperature and relative humidity via sensors 3 and 5 until indoor temperature T is once again within T_t degrees of T_out, i.e. indoor and outside temperatures return to an approximate equilibrium. During this time, the control unit is still recording values for indoor dry bulb temperature and relative humidity as measured by sensors 3 and 5 at regular time intervals, and storing said recorded values on either the control unit 7 or in a preferred embodiment on the network server 14.

The control unit 7 or in a preferred embodiment the network server 14 is thus able to estimate the energy consumption required to overcome a delta between a desired (or "end point") temperature and a starting indoor temperature based on known characteristics of the HVAC unit 13 and time intervals during the learning cycle, as well as how the previously untested mode's activation affects relative humidity during the cycle, given a set of outside conditions known to the control unit 7 or preferably the network server 14.

Figure 6:
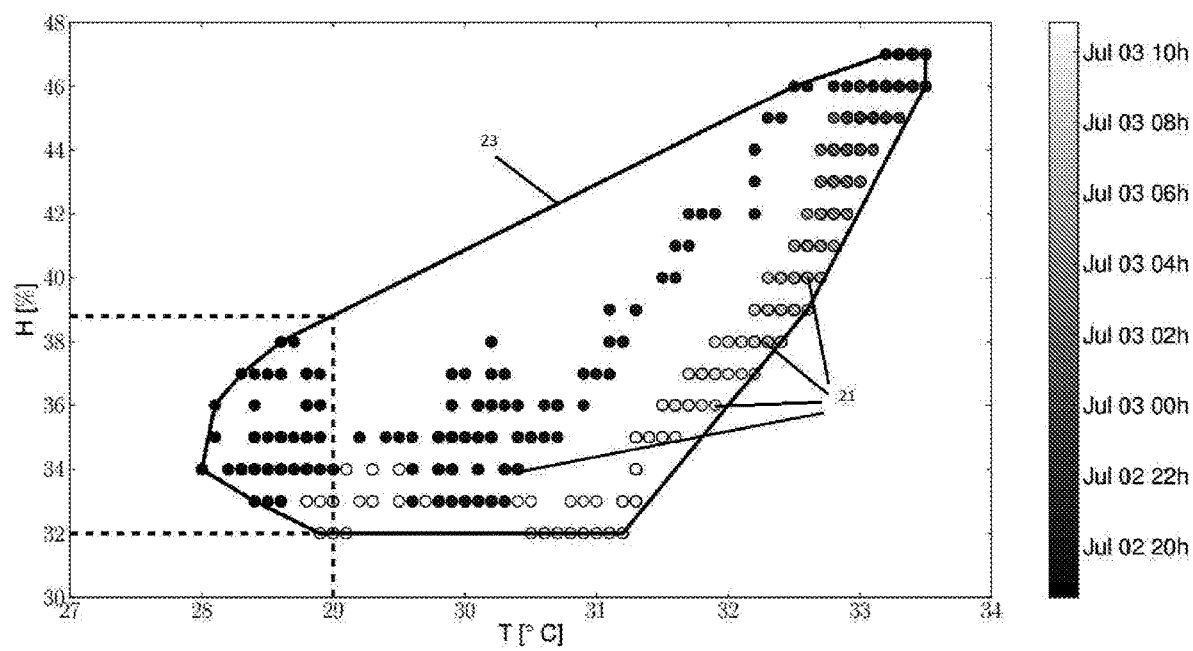
FIG. 6 shows an example convex hull used in the calculation of climate paths according to another embodiment of the present invention.

FIG. 6 shows a graph of recorded values 21 for indoor temperature T and indoor relative humidity H for a set of time intervals and a given set of outside conditions. These values 21 were obtained during the learning mode for an untested cooling mode on an HVAC unit over a 14 hour period and are stored on the control unit 7 or preferably the network server 14. A convex hull 23 is generated according to the recorded data over such a cycle. In machine learning, a convex hull is the smallest convex set required to accommodate all the stored values for T and H over the time period. The control unit 7 or preferably the network server 14 is thus able to identify from its recorded dataset for a given mode of a given HVAC unit situated in a given indoor climatic environment a range of possible relative humidity values for a given indoor temperature (and vice versa), for a known set of outside conditions, as shown in FIG. 6. The control unit 7 or preferably the network server 14 is also able to estimate the time (and therefore energy) taken to reach a certain end point relative humidity value and temperature from a given starting point, for a known set of outside conditions. The control unit 7 or preferably the network server 14 then in a preferred embodiment separates the dataset in a number of hyperplanes via a support vector machine (a well-known machine learning technique) and for the hyperplane with the best separation computes the parameters aT, bT, and αE for the previously untested mode of the HVAC unit 13. In the preferred embodiment the hyperplane computation and the parameters are stored in the networked server 14. Alternative machine learning techniques to support vector machines include linear approximations or estimating new equations via least squares regressions, linear discriminant analysis, Bayesian methods, higher order polynomials, or neural networks.

As outside conditions vary, adjustments can be made to the parameters aT, bT, and αE to approximate the effects of such variations on the HVAC unit 13. In a preferred embodiment, learning mode is repeated for different sets of outside conditions so that the best adjustments can be made.

Figure 5:
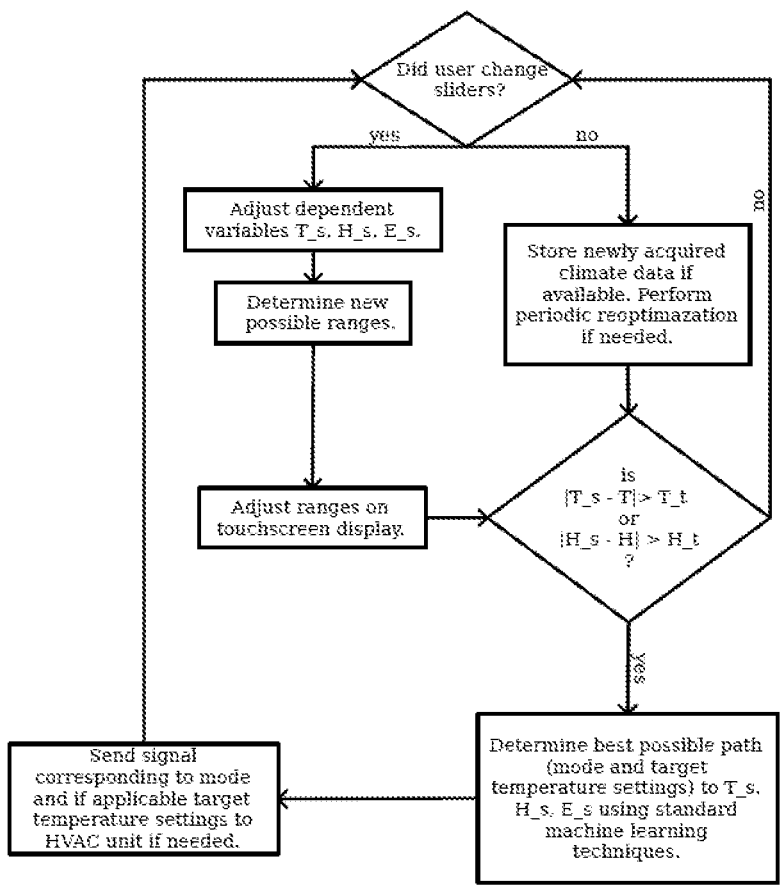
FIG. 5 is a block diagram of the operation of a climate controller in operating mode according to another embodiment of the present invention.

In a preferred embodiment of the climate controller's operation mode shown in FIG. 5, the control unit 7, or in a preferred embodiment the network server 14, communicates a set of interdependent ranges gathered from the convex hull 23, along with the hyperplane separation calculation and parameters for the current outside conditions at the climate controller's approximate location, to the computer 12 which are displayed on the sliders 20 in a user interface 11. Current humidity, temperature and energy usage (according to the current state of activation of the HVAC unit 13) are also communicated to the computer 12 by the control unit 7 over the network interface 9. Embodiments of the user interface 11 are shown in FIGS. 2 and 3. Thus, for a constrained slider value of either T, H, E or Time the values of the three other sliders can be computed by the computer 12 and ranges adjusted accordingly. In an alternative embodiment of the climate controller's operation mode, all computation is carried out on network server 14 and values for the sliders 20 are directly communicated to the user interface 11.

In a preferred embodiment, a user is able to enter into the user interface 11 a comfort level. The comfort level is a combination of indoor dry bulb temperature and relative humidity, according to the well known Heat Index Equation based on the work of R. G. Steadman. In a preferred embodiment, the user interface 11 is additionally capable of presenting a suggested comfort level to the user to maximize his or her comfort given current outside conditions whilst minimizing energy usage or time taken to reach that comfort level. Knowledge of the ideal comfort level of the user comes from recording the user's past inputs and selections made via the user interface 11.

Figure 7:
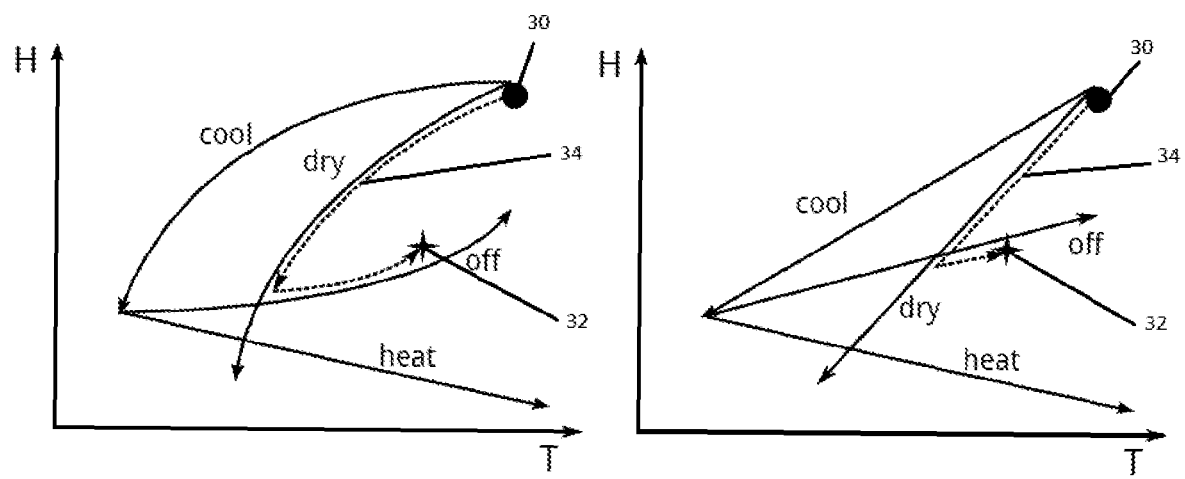
FIG. 7 shows possible climate paths in the relative humidity—temperature plane to reach a desired relative humidity/temperature from a starting point relative humidity/temperature by operating an HVAC unit in different modes, with the selected path calculated by a climate controller according to an embodiment of the present invention.

Once the user selects a desired comfort level via the user interface 11, this is communicated to the control unit 7 or in a preferred embodiment the network server 14. If the number of possible modes on the HVAC unit 13 is M, and the number of steps on a path, i.e. different HVAC unit activation modes following on from each other, taken to reach a desired comfort level from an initial starting point, is n, there are M^n possible combinations of different paths. It is therefore not feasible to conduct an exhaustive search for the best or shortest (minimizing energy usage or time) path from current indoor climatic conditions to desired comfort level. However, the control unit 7 or in a preferred embodiment the network server 14 drastically reduces the search space having already obtained a linear or polynomial approximation of a convex hull 23 according to the machine learning methods outlined above. A path calculation and its linear alternative are shown in FIG. 7, wherein it can be seen that the shortest path from an initial indoor climatic condition 30 to a target comfort level 32 given a set of outside conditions and for an HVAC unit with known characteristics is the path 34, which in the preferred embodiment translates to activating the HVAC unit 13 via the infra red module 15 in its drying mode for a certain time before deactivating the HVAC unit 13.

During operation mode, additional data points are gathered relating to the currently activated mode of the HVAC unit 13 and stored on the control unit 7 or preferably the network server 14. In a preferred embodiment, the convex hull 23 is periodically regenerated and via the aforementioned machine learning techniques the parameters for that HVAC unit mode and depending on the machine learning method chosen the hyperplane computation and/or equations re-calculated, such that the climate controller 1 is able to continuously optimize its performance.

The operation mode of the climate controller 1 is summarized in FIG. 5.

It can be appreciated that the aforesaid embodiments are only exemplary embodiments adopted to describe the principles of the present invention, and the present invention is not merely limited thereto. Various variants and modifications may be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations. In particular, there are many possible permutations of the circuit arrangements described above which use the same passive method to achieve passive power factor correction, and which will be obvious to those skilled in the art.

The invention claimed is:

1. A climate controller comprising:
a control unit for controlling two or more functions of an HVAC unit servicing a climate controlled space, wherein the two or more functions are selected from the following: temperature setting, fan speed, mode, and on/off setting;
a temperature sensor for taking temperature measurements and communicating the temperature measurements to the control unit; and
a humidity sensor for taking humidity measurements and communicating the humidity measurements to the control unit,
wherein the control unit is operable to control the two or more functions of the HVAC unit by sending signals to the HVAC unit to set setpoints for the two or more functions, and the control unit is further operable to calculate the setpoints using machine learning trained on past and present temperature and humidity measurements to predict future temperatures and humidities, in order to achieve a desired temperature and a desired humidity in the climate controlled space.

2. The climate controller according to claim 1 wherein the control unit is further operable to implement machine learning methods and to calculate the setpoints based on one or more additional environmental parameters.

3. The climate controller according to claim 2 wherein the one or more additional environmental parameters is selected from the following: luminosity, time of day, passive infrared activity count, outdoor temperature, and outdoor humidity.

4. The climate controller according to claim 1 wherein the desired temperature and humidity correspond to a desired apparent temperature.

5. The climate controller according to claim 4 comprising a network interface to communicatively connect the control unit to a computer processor, and the computer processor is operable to receive one or more of the desired temperature, humidity, and apparent temperature as selected by a user.

6. The climate controller according to claim 4 comprising a network interface to communicatively connect the control unit to a computer processor, the computer processor communicatively connected to a data storage device and operable to retrieve one or more of the desired temperature, humidity, and apparent temperature pre-stored on the data storage device.

7. The climate controller according to claim 4 wherein one or more of the desired temperature, humidity, and apparent temperature lie within a respective comfort band defined by a minimum and a maximum respective desired temperature, humidity, or apparent temperature.

8. The climate controller according to claim 7 comprising a network interface to communicatively connect the control unit to a computer processor, and the computer processor is operable to receive the comfort band as selected by a user.

9. The climate controller according to claim 7 comprising a network interface to communicatively connect the control unit to a computer processor, the computer processor communicatively connected to a data storage device and operable to retrieve the comfort band pre-stored on the data storage device.

10. The climate controller according to claim 9 wherein the computer processor is operable to recommend the comfort band to a user.

11. The climate controller according to claim 1 wherein the setpoints are selected on the basis of the minimum power consumption required to achieve the desired temperature and humidity.

12. The climate controller according to claim 1 wherein the setpoints are selected on the basis of a target time required to achieve the desired temperature and humidity.

13. The climate controller according to claim 1 comprising a network interface to communicatively connect the control unit to a computer processor, the computer processor communicatively connected to a user interface and operable to display the temperature and humidity measurements on the user interface.

14. The climate controller according to claim 13 wherein the control unit is further operable to control the computer processer to display the user interface comprising a plurality of sliders, each slider being operable to display a plurality of values of a parameter corresponding to at least one of climatic environment and energy consumption, the plurality of values comprising a desired value, a current value, and an interdependent range of values calculated taking into account the settings of the other sliders.

15. The climate controller according to claim 1 comprising an infrared module, the control unit is further operable to use the infrared module to send infrared signals to the HVAC unit to control one or more functions of the HVAC unit.

16. The climate controller according to claim 15 wherein the HVAC unit comprises a remote control for sending infrared signals to the HVAC unit to control one or more functions of the HVAC unit, the infrared module is operable to replicate one or more of the infrared signals sent by the remote control.

17. The climate controller according to claim 14 wherein the plurality of sliders of the user interface comprising at least one of a temperature slider, a humidity slider, an energy slider, and a time slider.

* * * * *